(12) United States Patent
Ariga et al.

(10) Patent No.: US 12,034,125 B2
(45) Date of Patent: Jul. 9, 2024

(54) ELECTRODE AND SECONDARY BATTERY INCLUDING THE SAME

(71) Applicant: HONDA MOTOR CO., LTD., Tokyo (JP)

(72) Inventors: Toshiyuki Ariga, Saitama (JP); Takuya Taniuchi, Saitama (JP); Masahiro Ohta, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 106 days.

(21) Appl. No.: 17/647,465

(22) Filed: Jan. 9, 2022

(65) Prior Publication Data
US 2022/0223920 A1 Jul. 14, 2022

(30) Foreign Application Priority Data
Jan. 13, 2021 (JP) .................. 2021-003294

(51) Int. Cl.
H01M 10/0585 (2010.01)
H01M 4/66 (2006.01)
(Continued)

(52) U.S. Cl.
CPC ....... *H01M 10/0585* (2013.01); *H01M 4/661* (2013.01); *H01M 4/762* (2013.01);
(Continued)

(58) Field of Classification Search
CPC .. H01M 10/0585; H01M 4/661; H01M 4/762; H01M 4/80; H01M 10/0525;
(Continued)

(56) References Cited

U.S. PATENT DOCUMENTS

| 2004/0018426 | A1* | 1/2004 | Chieh | H01M 50/562 429/177 |
| 2016/0028089 | A1* | 1/2016 | Arpin | H01M 4/80 205/75 |
| 2017/0288181 | A1* | 10/2017 | Hwang | H01M 4/587 |

FOREIGN PATENT DOCUMENTS

| CN | 108963334 A | * 12/2018 |
| JP | 2004158222 A | * 6/2004 |

(Continued)

OTHER PUBLICATIONS

English translation KR20180048310A as taught by kaga (Year: 2018).*

(Continued)

*Primary Examiner* — Brittany L Raymond
(74) *Attorney, Agent, or Firm* — CKC & PARTNERS CO., LLC

(57) ABSTRACT

To improve the adhesion between an electrode material mixture and a solid electrolyte, and thereby suppress electrodeposition of lithium. This electrode includes a planar electrode current collector including a metal porous body, an electrode material mixture layer that fills pores of the metal porous body, and a solid electrolyte layer that fills pores of the metal porous body. The electrode material mixture layer is formed on one side of the electrode current collector, and the solid electrolyte layer is formed on the other side of the electrode current collector. The electrode material mixture layer and the solid electrolyte layer are stacked in a planar shape in the pores of the metal porous body.

4 Claims, 3 Drawing Sheets

(51) Int. Cl.
    *H01M 4/76*          (2006.01)
    *H01M 4/80*          (2006.01)
    *H01M 10/0525*    (2010.01)
    *H01M 50/531*     (2021.01)

(52) U.S. Cl.
    CPC ......... *H01M 4/80* (2013.01); *H01M 10/0525*
          (2013.01); *H01M 50/531* (2021.01)

(58) Field of Classification Search
    CPC ...... H01M 50/531; H01M 4/13; H01M 10/05;
          Y02P 70/50
    See application file for complete search history.

(56) References Cited

FOREIGN PATENT DOCUMENTS

| | | | |
|---|---|---|---|
| JP | 2008226666 A | | 9/2008 |
| JP | 2013084490 A | * | 5/2013 |
| KR | 20180048310 A | * | 5/2018 |

OTHER PUBLICATIONS

English translation, JP-2013084490-A as taught by Goto (Year: 2013).*
English translation Jp2004158222A as taught by Baba (Year: 2004).*
English translation CN108963334A as taught by Zhou (Year: 2018).*

* cited by examiner

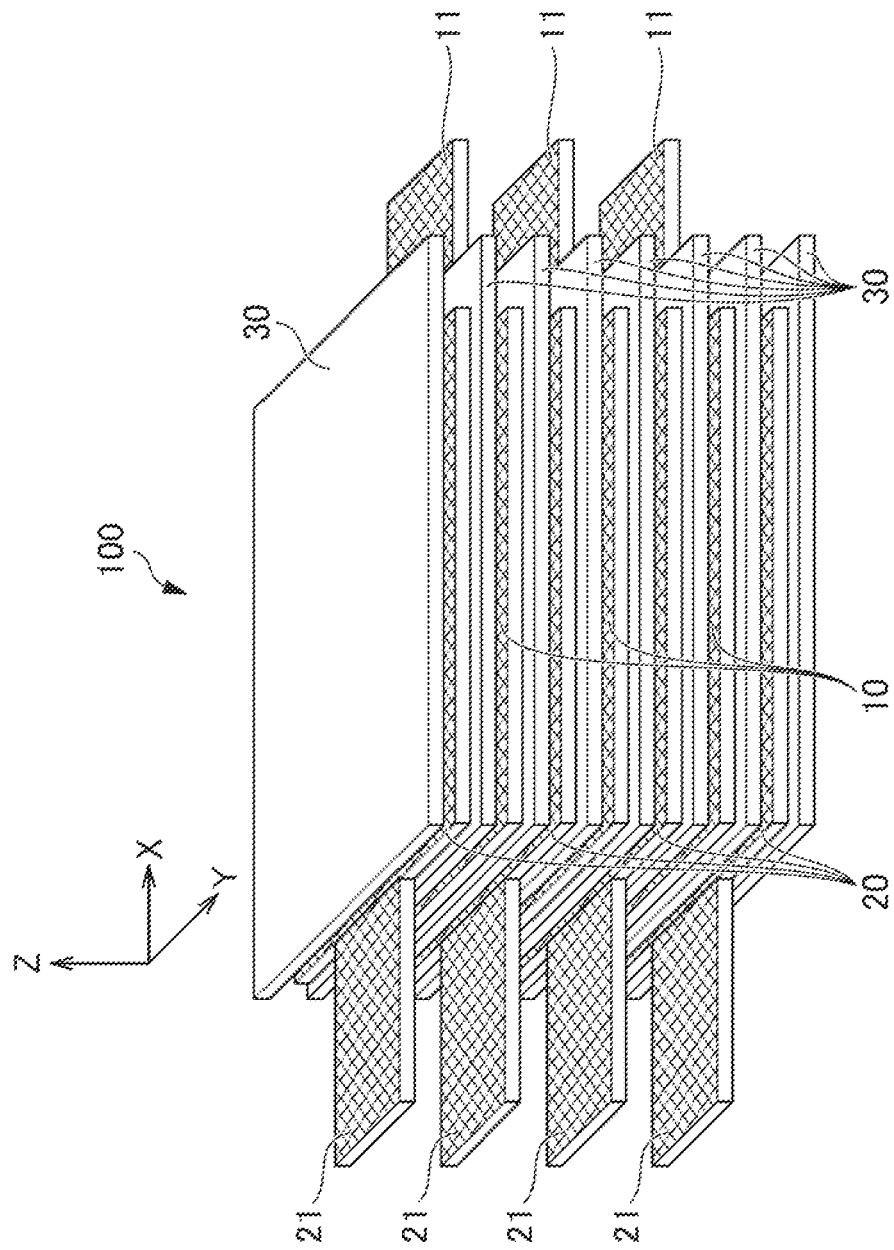

ELECTRODE AND SECONDARY BATTERY INCLUDING THE SAME

This application is based on and claims the benefit of priority from Japanese Patent Application No. 2021-003294, filed on 13 Jan. 2021, the content of which is incorporated herein by reference.

BACKGROUND OF THE INVENTION

Field of the Invention

The present invention relates to an electrode and a secondary battery including the same.

Related Art

Conventionally, lithium ion secondary batteries have been widely used as secondary batteries having a high energy density. In the case of a solid-state battery where the electrolyte is solid, the battery has a cell structure in which a solid electrolyte is present between a positive electrode and a negative electrode. A plurality of the cells are stacked on one another to construct a solid lithium ion secondary battery.

In the case of a solid-state battery, sufficient adhesion is required between an electrode material mixture containing a positive electrode active material or a negative electrode active material and a solid electrolyte from the viewpoint of maintaining the ionic conductivity of lithium ions or the like. If the adhesion decreases due to repeated expansion and contraction during charging and discharging, electrodeposition of lithium occurs and ionic conductivity decreases.

In this regard, for example, Patent Document 1 discloses a structure in which both sides of a solid electrolyte layer having a dense structure are sandwiched between porous solid electrolytes, and pores of the solid electrolyte are filled with an electrode material mixture, and thereby the electrode material mixture and the solid electrolyte are integrated.

Patent Document 1: Japanese Unexamined Patent Application, Publication No. 2008-226666

SUMMARY OF THE INVENTION

However, even in Patent Document 1, the porous solid electrolyte is a so-called green sheet, and the adhesion between the electrode material mixture and the solid electrolyte is insufficient, and further improvement is required.

In response to the above issue, it is an object of the present invention to improve the adhesion between an electrode material mixture and a solid electrolyte, and thereby suppress electrodeposition of lithium.

The inventors have found that the above issue can be solved by stacking an electrode material mixture layer and a solid electrolyte layer in a planar shape in pores of a metal porous body, and have completed the present invention. That is, the present invention provides the following.

(1) A first aspect of the present invention relates to an electrode, including a planar electrode current collector including a metal porous body,
an electrode material mixture layer including an electrode material mixture that fills pores of the metal porous body, and
a solid electrolyte layer including a solid electrolyte that fills pores of the metal porous body. The electrode material mixture layer and the solid electrolyte layer are stacked in a planar shape in the pores of the metal porous body.

According to the first aspect, by stacking the electrode material mixture layer and the solid electrolyte layer in a planar shape in the pores of the metal porous body, it is possible to follow volume changes during charging and discharging, and thereby suppress electrodeposition of lithium.

(2) In a second aspect of the present invention according to the first aspect, the electrode further includes a tab that extends from an end of the metal porous body. In plan view, at least an end edge of the solid electrolyte layer in a direction of the tab is located beyond an end edge of the electrode material mixture layer in the direction of the tab.

According to the invention of the second aspect, it is possible to effectively prevent short circuits between the positive and negative electrodes and breakage of the tab as a current collector.

(3) A third aspect of the present invention relates to an electrode obtained by combining two of the electrodes according to the first or second aspect having the same polarity. The electrode material mixture layers of the electrodes are configured to be joined together so as to face each other.

According to the invention of the third aspect, the energy density can be improved by joining together a pair of identical electrodes.

(4) A fourth aspect of the present invention relates to a secondary battery, including the electrode according to the first or second aspect including a positive electrode including a positive electrode material mixture as the electrode material mixture, and
the electrode according to the first or second aspect including a negative electrode including a negative electrode material mixture as the electrode material mixture. The solid electrolyte layers of the positive electrode and the negative electrode are joined together so as to face each other.

According to the invention of the fourth aspect, it is possible to provide a secondary battery that achieves the effect of the first or second aspect.

(5) In a fifth aspect of the present invention according to the fourth aspect, a second solid electrolyte layer is disposed between the solid electrolyte layers.

According to the invention of the fifth aspect, it is possible to improve the effect of preventing short circuits between the positive and negative electrodes.

BRIEF DESCRIPTION OF THE DRAWINGS

FIG. 1 is a perspective view of an embodiment of a secondary battery including an electrode of the present invention;

DETAILED DESCRIPTION OF THE INVENTION

Figure 2A:
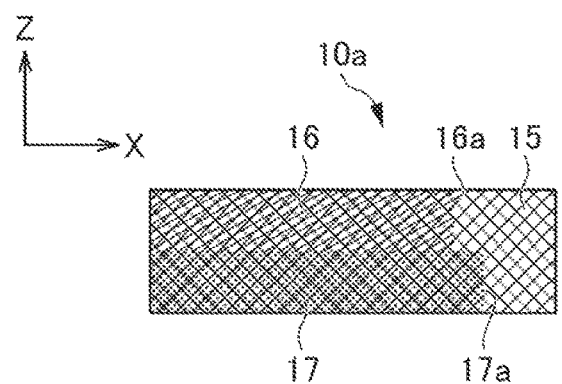
FIG. 2A is a process diagram showing an example of the method for manufacturing the electrode of the present invention.

Embodiments of the present invention will now be described with reference to the drawings. The present invention is not limited to the following embodiments. In the following embodiments, a solid-state lithium ion battery will be used as an example, but the present invention can be applied to batteries other than lithium ion batteries.

First Embodiment

<Overall Structure of Lithium Ion Secondary Battery>

As shown in FIG. 1, a lithium ion secondary battery 100 according to the present embodiment is a solid-state battery, and is an electrode stack in which a positive electrode 10 and a negative electrode 20 are alternately arranged with a solid electrolyte layer 30 provided therebetween. A positive electrode tab 11 and a negative electrode tab 21 each extends from an end of the current collector of each electrode of the electrode stack. FIG. 1 shows the state before tab convergence, and the convergence portion is omitted.

The respective components will be described below.

<Positive Electrode and Negative Electrode>

In this embodiment, the positive electrode 10 and the negative electrode 20 each include a current collector including a metal porous body having pores that are continuous with each other (communicating pores).

The pores of each current collector are filled with an electrode material mixture (positive electrode material mixture or negative electrode material mixture) containing an electrode active material, which is a region that is filled with the electrode material mixture. Conversely, the positive electrode tab 11 and the negative electrode tab 21 are regions that are not respectively filled with the electrode material mixtures.

(Current Collector)

The current collector includes a metal porous body having pores that are continuous with each other. Having pores that are continuous with each other allows the pores to be filled with a positive electrode material mixture or a negative electrode material mixture containing an electrode active material, thereby increasing the amount of the electrode active material per unit area of the electrode layer. The form of the metal porous body is not limited as long as it has pores that are continuous with each other. Examples of the form of the metal porous body include a foam metal having pores by foaming, a metal mesh, an expanded metal, a punching metal, and a metal nonwoven fabric.

The metal used in the metal porous body is not limited as long as it has electric conductivity. Examples thereof include nickel, aluminum, stainless steel, titanium, copper, and silver. Among these, as the current collector constituting the positive electrode, a foamed aluminum, foamed nickel, and foamed stainless steel are preferable. As the current collector constituting the negative electrode, a foamed copper and foamed stainless steel are preferable.

By using the current collector including the metal porous body, the amount of the active material per unit area of the electrode can be increased, and as a result, the volumetric energy density of the lithium ion secondary battery can be improved. In addition, since the positive electrode material mixture and the negative electrode material mixture are easily fixed, it is not necessary to thicken a coating slurry for forming the electrode material mixture layer when the electrode material mixture layer is thickened, unlike a conventional electrode including a metal foil as a current collector. Accordingly, it is possible to reduce a binder such as an organic polymer compound that has been necessary for thickening. Therefore, the capacity per unit area of the electrode can be increased, and a higher capacity of the lithium ion secondary battery can be achieved.

(Electrode Material Mixture)

The positive electrode material mixture and the negative electrode material mixture are respectively disposed in the pores formed within the current collectors. The positive electrode material mixture and the negative electrode material mixture respectively contain a positive electrode active material and a negative electrode active material as an essential component.

(Electrode Active Material)

The positive electrode active material is not limited as long as it can occlude and release lithium ions. Examples thereof include $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $Li(Ni_{1/3}Co_{1/3}Mn_{1/3})O_2$, $LiCoO_4$, $LiMn_2O_4$, $LiNiO_2$, $LiFePO_4$, lithium sulfide, and sulfur.

The negative electrode active material is not limited as long as it can occlude and release lithium ions. Examples thereof include metallic lithium, lithium alloys, metal oxides, metal sulfides, metal nitrides, Si, SiO, and carbon materials such as artificial graphite, natural graphite, hard carbon, and soft carbon.

(Other Components)

The electrode material mixture may optionally include components other than an electrode active material and ionic conductive particles. The other components are not limited, and can be any components that can be used in fabricating a lithium ion secondary battery. Examples thereof include a conductivity aid and a binder. The conductivity aid of the positive electrode is, for example, acetylene black, and the binder of the positive electrode is, for example, polyvinylidene fluoride. Examples of the binder of the negative electrode include sodium carboxyl methyl cellulose, styrene-butadiene rubber, and sodium polyacrylate.

(Method for Manufacturing Positive Electrode and Negative Electrode)

The positive electrode 10 and the negative electrode 20 are each obtained by filling pores that are continuous with each other of a metal porous body as a current collector with an electrode material mixture. First, an electrode active material and, if necessary, a binder and a conductivity aid, are uniformly mixed by a conventionally known method, and thus an electrode material mixture composition adjusted to a predetermined viscosity, preferably in the form of a paste, is obtained.

Subsequently, pores of a metal porous body, which is a current collector, are filled with the above electrode material mixture composition as an electrode material mixture. The method of filling the current collector with the electrode material mixture is not limited, and is, for example, a method of filling the pores of the current collector with a slurry containing the electrode material mixture by applying pressure using a plunger-type die coater. As an alternative, the interior of the metal porous body may be impregnated with an ion conductor layer by a dipping method.

A solid electrolyte layer 17 with which pores of a metal porous body 15 are filled, which is described later, can be formed by the same method.

<Solid Electrolyte Layer>

As shown in FIG. 1, in the present invention, a second solid electrolyte layer 30 may be formed between the positive electrode 10 and the negative electrode 20. The same material can be used for the solid electrolyte layer 17 with which pores of the metal porous body 15 are filled, which is described later.

The solid electrolyte constituting the second solid electrolyte layer 30 is not limited, and is, for example, a sulfide solid electrolyte material, an oxide solid electrolyte material, a nitride solid electrolyte material, or a halide solid electrolyte material. Examples of the sulfide solid electrolyte material include LPS halogens (Cl, Br, and I), $Li_2S$—$P_2S_5$, and $Li_2S$—$P_2S_5$—LiI for lithium ion batteries. The above-described "$Li_2S$—$P_2S_5$" refers to a sulfide solid electrolyte material including a raw material composition containing $Li_2S$ and $P_2S_5$, and the same applies to the "$Li_2S$—$P_2S_5$—LiI". Examples of the oxide solid electrolyte material include NASICON-type oxides, garnet-type oxides, and perovskite-type oxides for lithium ion batteries. Examples of the NASICON-type oxides include oxides containing Li, Al, Ti, P, and O (e.g., $Li_{1.5}Al_{0.5}Ti_{1.5}(PO_4)_3$). Examples of the garnet-type oxides include oxides containing Li, La, Zr, and O (e.g., $Li_7La_3Zr_2O_{12}$). Examples of the perovskite-type oxides include oxides containing Li, La, Ti, and O (e.g., $LiLaTiO_3$).

<Structure of Electrode>

First Embodiment

An embodiment of the electrode, which is a feature of the present invention, will be specifically described using FIG. 2. FIG. 2 is a process diagram showing an example of the method for manufacturing the electrode of the present invention. The case of a positive electrode 10 is shown below as an example. The same can be applied to a negative electrode 20.

FIG. 2A is an XZ cross-sectional view of a positive electrode 10a, which is one of the positive electrodes 10 in FIG. 1. The positive electrode 10a includes a planar electrode current collector including a metal porous body 15, an electrode material mixture layer (positive electrode material mixture layer) 16 including an electrode material mixture that fills pores of the metal porous body 15, and a solid electrolyte layer 17 including a solid electrolyte that fills pores of the metal porous body 15. The electrode material mixture layer 16 and the solid electrolyte layer 17 are stacked in a planar shape in the pores of the metal porous body 15. In FIG. 1, as shown in FIG. 2A, the electrode material mixture layer 16 is formed above and the solid electrolyte layer 17 is formed below.

The term "planar" in the present invention means that the metal porous body 15 is a planar body having an XY plane in FIG. 1 and a predetermined thickness in a Z direction. The term "stacked in a planar shape" means that the electrode material mixture layer 16 and the solid electrolyte layer 17 are stacked one above the other (in the Z direction) in the pores of the metal porous body 15.

The positive electrode 10a can be obtained, for example, by coating the electrode material mixture layer 16 and the solid electrolyte layer 17 with a predetermined viscosity from the front and back sides of the metal porous body 15, respectively, i.e., applying them separately on the upper and lower sides. By filling pores of the metal porous body 15 having a network structure with each of the layers, it is possible to obtain an electrode that can follow volume changes during charging and discharging using the elasticity of the metal porous body 15, and thereby suppress electrodeposition of lithium. In addition, since the metal porous body 15 serves as a matrix, the adhesion between the electrode material mixture layer 16 and the solid electrolyte layer 17 can be maintained.

As shown in FIG. 2A, in the cross-sectional view, an end edge 17a of the solid electrolyte layer 17 in the direction of a tab is at a position extending beyond an end edge 16a of the electrode material mixture layer 16 in the direction of the tab. In other words, in plan view, at least the end edge 17a of the solid electrolyte layer in the direction of the tab is located beyond the end edge 16a of the electrode material mixture layer in the direction of the tab. This effectively prevents short circuits between the positive and negative electrodes and breakage of the tab as a current collector. As shown in FIG. 2A, the end edge 17a only needs to extend beyond the position of the end edge 16a, and for example, the end edge 17a may be configured to cover the end edge 16a.

Figure 2B:
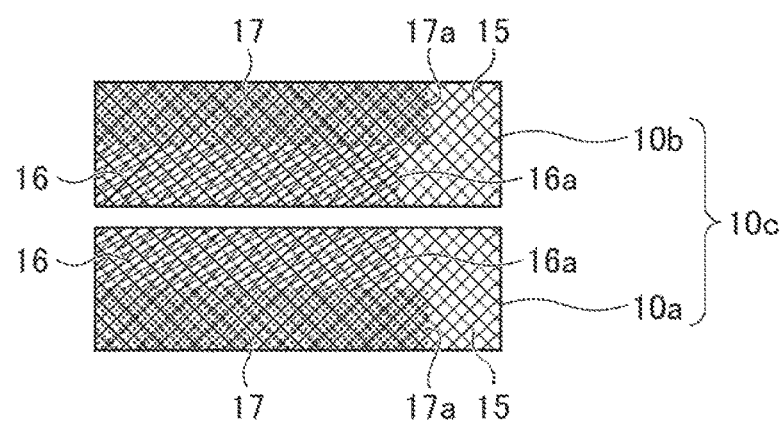
FIG. 2B is a process diagram showing an example of the method for manufacturing the electrode of the present invention.

Herein, in the present invention, the positive electrode 10a in FIG. 2A may be used as a positive electrode as is. However, in this embodiment, as shown in FIG. 2B, the electrode 10a and an electrode 10b that are identical to each other are joined together by pressing or the like so that the electrode material mixture layers 16 face each other, to construct a positive electrode 10c. The structure of joining together a pair of identical electrodes can improve the energy density, which is preferable. In addition, on the joining faces, the metal porous bodies 15 are intertwined with each other and joined together, so that the adhesion between the joining faces can be maintained firmly.

Figure 2C:
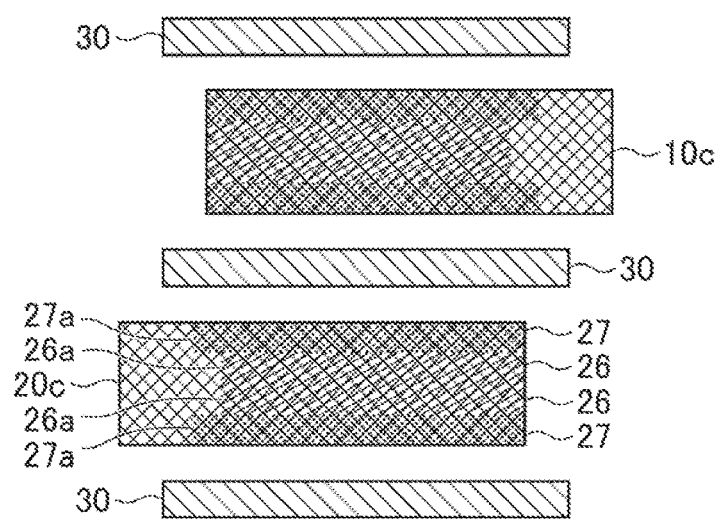
FIG. 2C is a process diagram showing an example of the method for manufacturing the electrode of the present invention.

Finally, as shown in FIG. 2C, the second solid electrolyte layer 30, the positive electrode 10c, the second solid electrolyte layer 30, a negative electrode 20c, and the second solid electrolyte layer 30 are stacked on one another. In this manner, the lithium ion secondary battery 100 in FIG. 1 can be obtained by stacking the positive electrode and the negative electrode via the second solid electrolyte layer 30 that is independent and separate. In the negative electrode 20c, as in the positive electrode 10c, an electrode material mixture layer (negative electrode material mixture) 26 and a solid electrolyte layer 27 (identical to the solid electrolyte layer 17) are stacked one above the other in pores of a metal porous body 25.

In the present invention, the second solid electrolyte layer 30 is not necessarily required, but from the viewpoint of preventing short circuits between the positive and negative electrodes, it is preferable to arrange the second solid electrolyte layer 30.

Second Embodiment

Figure 3A:
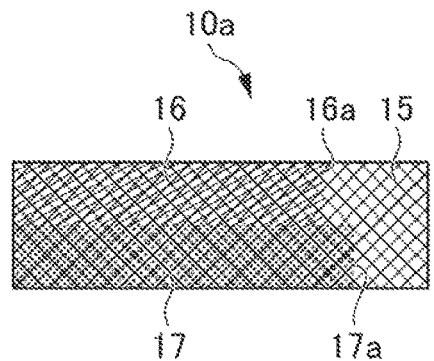
FIG. 3A is a process diagram showing another example of the method for manufacturing the electrode of the present invention.
Figure 3B:
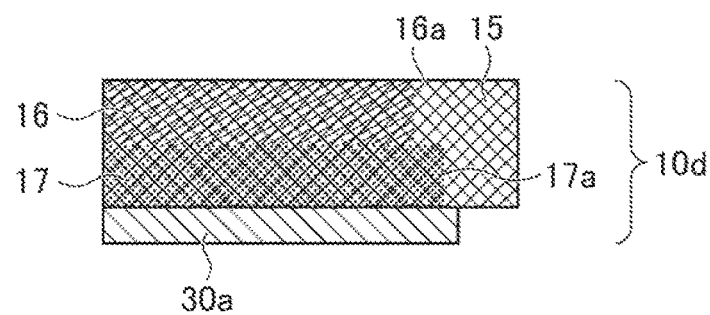
FIG. 3B is a process diagram showing another example of the method for manufacturing the electrode of the present invention.
Figure 3C:
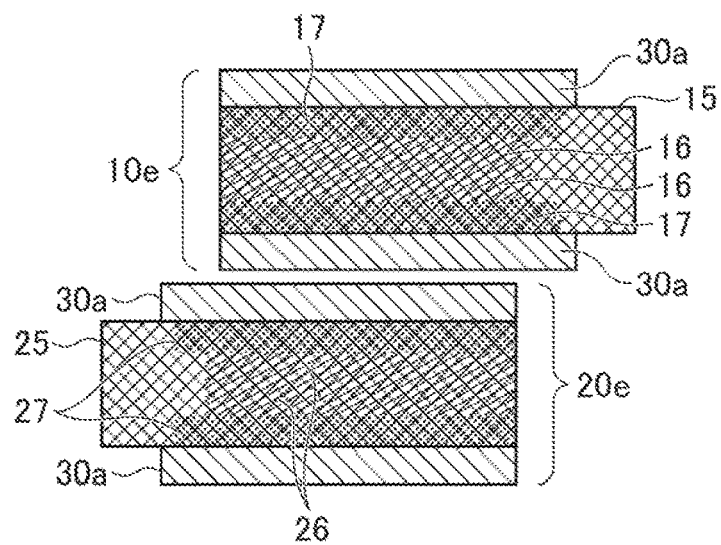
FIG. 3C is a process diagram showing another example of the method for manufacturing the electrode of the present invention.

FIG. 3 shows another embodiment of the present invention. In this embodiment, obtaining the positive electrode 10a in FIG. 3A is the same as in the first embodiment described above. In FIG. 3B, a solid electrolyte layer 30a is formed on the solid electrolyte layer 17 by coating to manufacture an electrode 10d, which is the positive electrode/solid electrolyte stack. Subsequently, as shown in FIG. 3C, electrodes 10d that are identical to each other are joined together by pressing or the like so that the electrode material mixture layers 16 face each other, to construct a positive electrode 10e. A negative electrode 20e is manufactured in the same manner, and finally, the positive electrode 10e and the negative electrode 20e are stacked. The lithium ion secondary battery 100 in FIG. 1 can also be obtained by this method.

In this case, only one of the opposing solid electrolyte layers 30a in FIG. 3C may be formed.

Although preferred embodiments of the present invention have been described above, the present invention is not limited to the above embodiments and can be modified as appropriate.

EXPLANATION OF REFERENCE NUMERALS 10 positive electrode
10a positive electrode
10b positive electrode
10c positive electrode
10e positive electrode
11 positive electrode tab
15 metal porous body
16 electrode material mixture layer (positive electrode material mixture layer)
16a end edge
17 solid electrolyte layer
17a end edge
20 negative electrode
20c negative electrode
20e negative electrode
21 negative electrode tab
26 electrode material mixture layer (negative electrode material mixture layer)
26a end edge
27 solid electrolyte layer
27a end edge
30 second solid electrolyte layer
100 lithium ion secondary battery

What is claimed is:

1. An electrode, comprising:
a planar electrode current collector comprising a metal porous body;
an electrode material mixture layer comprising an electrode material mixture that fills pores of a first portion of the metal porous body; and
a solid electrolyte layer comprising a solid electrolyte that fills pores of a second portion of the metal porous body; and
a tab that extends from an end of the metal porous body,
the electrode material mixture layer and the solid electrolyte layer being stacked in a planar shape within the metal porous body, and
in plan view, at least an end edge of the solid electrolyte layer within the second portion of the metal porous body and in a direction of the tab being located beyond an end edge of the electrode material mixture layer within the first portion of the metal porous body and in the direction of the tab.

2. A secondary battery, comprising:
the electrode according to claim 1 comprising a positive electrode comprising a positive electrode material mixture as the electrode material mixture; and
the electrode according to claim 1 comprising a negative electrode comprising a negative electrode material mixture as the electrode material mixture,
the solid electrolyte layers of the positive electrode and the negative electrode being joined together so as to face each other.

3. The secondary battery according to claim 2, wherein a second solid electrolyte layer is disposed between the solid electrolyte layers.

4. An electrode stack, comprising:
a first electrode, comprising:
a planar electrode current collector comprising a metal porous body;
an electrode material mixture layer comprising an electrode material mixture that fills, in a planar shape, pores of a first portion of the metal porous body on one surface side of the metal porous body; and
a solid electrolyte layer comprising a solid electrolyte that fills, in a planar shape, pores of a second portion of the metal porous body on a surface side of the metal porous body opposite to the one surface side,
the electrode material mixture layer and the solid electrolyte layer being stacked in a planar shape within the metal porous body, and
a second electrode, comprising:
a planar electrode current collector comprising a metal porous body,
an electrode material mixture layer comprising an electrode material mixture that fills in a planar shape pores of a first portion of the metal porous body on one surface side of the metal porous body; and
a solid electrolyte layer comprising a solid electrolyte that fills, in a planar shape, pores of a second portion of the metal porous body on a surface side of the metal porous body opposite to the one surface side,
the electrode material mixture layer and the solid electrolyte layer being stacked in a planar shape within the metal porous body,
the electrode material mixture layer of the first electrode being in direct contact with the electrode material mixture layer of the second electrode.

* * * * *